United States Patent Office 3,464,971
Patented Sept. 2, 1969

3,464,971
MONOAZO COMPOUNDS CONTAINING A PIPERAZINE TYPE RING SUBSTITUTED BY AN ORGANO SULFONYL GROUP
Max A. Weaver and David J. Wallace, Kingsport, Tenn., assignors to Eastman Kodak Company, Rochester, N.Y., a corporation of New Jersey
No Drawing. Filed Oct. 22, 1965, Ser. No. 502,432
Int. Cl. C09b 29/36, 29/08
U.S. Cl. 260—154                10 Claims

ABSTRACT OF THE DISCLOSURE

Phenyl-azo-aniline compounds in which the aniline nitrogen atom is a member of a heterocyclic ring containing a second nitrogen atom which is substituted with certain alkyl- and aryl-sulfonyl groups are useful as dyes for hydrophobic textile materials.

---

This invention relates to novel water insoluble azo compounds useful as dyes for hydrophobic textile fibers, yarns and fabrics.

The azo compounds of the invention are characterized by the general formula (I)

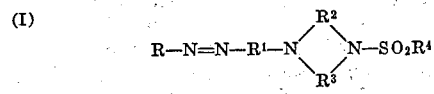

wherein R is a monocyclic carbocyclic aromatic group of the benzene series having the structure

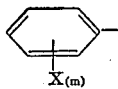

wherein

X represents lower alkyl, e.g., methyl, ethyl; lower alkoxy, e.g., methoxy; lower alkanoylamino, e.g., acetamido; nitro; halogen, e.g., chlorine, bromine; cyano; lower alkylsulfonyl, e.g., methylsulfonyl, substituted alkylsulfonyl, e.g., cyanoethylsulfonyl; carbamoyl; benzamido; lower carboalkoxy, e.g., carboethoxy; hydroxy; lower alkanoyl, e.g., acetyl; formyl; haloalkyl, e.g., chloromethyl, trifluoromethyl; sulfamoyl; lower alkylsulfonamido, e.g., ethylsulfonamido; dialkylsulfonamido, e.g., lower dialkylsulfamoyl, e.g., dimethylsulfamoyl combinations thereof; and $m$ represents 0, 1, 2 or 3;

$R^1$ represents a monocyclic carbocyclic aromatic group of the benzene series having the structure

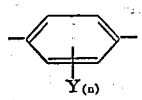

wherein

Y represents lower alkyl, e.g., methyl; lower alkoxy e.g., methoxy; lower alkanoylamino, e.g., acetamido; halogen, e.g., chlorine; lower alkylsulfonamide, e.g., methylsulfonamido; benzamido; lower alkylthio, e.g., methylthio; etc.; and combinations thereof;

$n$ represents 0, 1, 2 or 3;

$R^2$ and $R^3$ represent lower alkylene of 2 to 4 carbon atoms and may be the same or different alkylene groups;

$R^4$ represents lower alkyl, e.g., methyl; substituted alkyl, e.g., cyanoethyl, chloroethyl; cycloalkyl, e.g., cyclohexyl; aryl, e.g., phenyl and substituted phenyl such as tolyl, aminophenyl, nitrophenyl, bromophenyl; naphthyl or heterocyclic, e.g., thiophene.

As will be seen from the examples given below, the substituents on $R^4$ and those designated as X and Y, above, serve primarily as auxochrome groups to control the color of the azo compound.

The azo compounds of the invention are prepared by coupling the diazonium salts of compounds having the formula (II)     $R—NH_2$ with a compound having the formula (III)

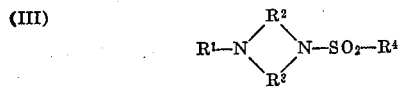

wherein R, $R^1$, $R^2$, $R^3$ and $R^4$ are defined above.

The azo compounds of the invention are used for dyeing textile materials, including synthetic polymer fibers, yarns and fabrics shades ranging from yellow to violet which are extremely fast to light and sublimation and further, have excellent fastness to washing and gas (atmopheric fumes).

The following examples will serve to illustrate the preparation of representative couplers and azo compounds of the invention.

PREPARATION OF THE COUPLERS

Preparation of 1-(phenyl)-4-(phenylsulfonyl)piperazine

An amount of 16.2 g. (0.1 m.) phenylpiperazine was slurried in 100 ml. 10% aqueous NaOH. Then 17.6 g. (0.1 m.) benzenesulfonyl chloride was added over 15 min. with good stirring. The temperature rose spontaneously to 50° C. The reaction was stirred 1 hr. longer without application of heat. Some solid crystallized out. The mixture was drowned in 300 ml. water, filtered, the white cake washed with water and dried. Yield—19 g., M.P. 139–40°. Recrystallization from ethanol failed to raise the melting point. The product has the structure:

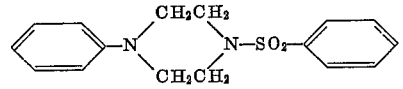

Preparation of 1-(tolyl)-4-(methylsulfonyl)piperazine

An amount of 11.6 (0.05 m.) N,N-bis-chloroethyl-m-toluidine, 4.8 g. (0.05 m.) methanesulfonamide, 13.8 g. (0.1 m.) $K_2CO_3$, and 100 ml. dry dimethylformamide was refluxed for 1 hr., then drowned in water. The product was filtered off, washed with water, then recrystallized from 250 ml. ethanol. Yield—9.0 g., M.P. 169–170°. The product has the structure:

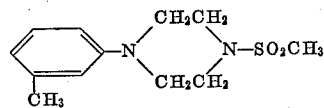

Preparation of 1-(phenyl)-4-(p-tolylsulfonyl)piperazine

An amount of 10.9 g. of N,N-bis-β-chloroethylaniline, 8.6 g. of p-toluenesulfonamide, 13.8 g. of potassium carbonate, and 100 ml. of dry dimethylformamide was refluxed together for 1 hr. The reaction mixture was drowned in water, filtered, washed with water, and air dried. The product was recrystallized from 100 ml. of methyl Cellosolve. Yield—11.2 g., M.P. 195–196° C. The product has the structure:

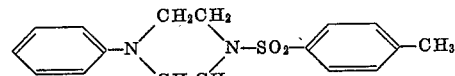

Preparation of 1-(phenylsulfonyl)-4-(m-tolyl)piperazine

An amount of 23.3 g. of N,N-bis-β-chloroethyl-m-toluidine, 15.7 g. of benzenesulfonamide, 27.6 g. of potassium carbonate, and 150 ml. of dry dimethylformamide was refluxed together for 1 hr. The reaction mixture was drowned in water, filtered, washed with water, and air dried. After recrystallization from 300 ml. of alcohol, there was obtained 23.8 g. of product. It melted at 93–94° C. and has the structure:

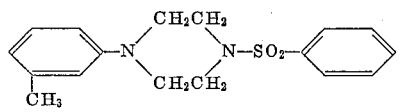

Preparation of 1-(m-methoxyphenyl)-4-(p-tolyl-sulfonyl)piperazine

An amount of 12.4 g. of N,N-bis-β-chloroethyl-m-anisidine, 8.6 g. of p-toluenesulfonamide, 13.8 g. of potassium carbonate, and 100 ml. of dry dimethylformamide was refluxed together for 1 hr. The reaction was drowned in water, filtered, washed with water, and air dried. The product was recrystallized from 100 ml. of methyl Cellosolve. Yield—10.5 g., M.P. 118–119° C. It has the structure:

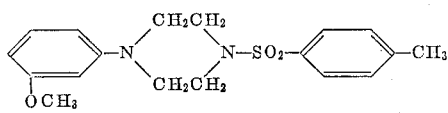

Preparation of 1-(m-chlorophenyl)-4-(phenyl-sulfonyl)piperazine

An amount of 12.6 g. of N,N-bis-β-chloroethyl-m-chloroaniline, 7.8 g. of benzenesulfonamide, 13.8 g. of potassium carbonate, and 100 ml. of dry dimethylformamide was refluxed together for 1 hr. The reaction was then drowned in water; the product was filtered, washed with water, air dried, and recrystallized from methyl Cellosolve. Yield—12.9 g., M.P. 141.5–1.42° C. It has the structure:

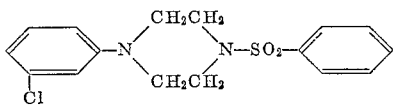

EXAMPLES OF THE DYES

Example 1

An amount of 1.27 g. p-chloroaniline was dissolved in 10 ml. water and 3 ml. conc. HCl. The solution was cooled to 2° C. and a solution of 0.72 g. $NaNO_2$ in 7 ml. water was added. The resulting clear solution was stirred at 0–5° C. for 1 hr. An amount of 2.54 g. (0.01 m.) of 1-(tolyl)-4-(methylsulfonyl)piperazine was dissolved in 15 ml. 1:5 acid and the solution cooled in an ice bath. The diazonium solution was added, and the mixture neutralized to brown on Congo Red paper with solid ammonium acetate. It was then allowed to couple for 2 hr., drowned with water, filtered, washed with water, and dried. The product dyes polyester fibers yellow shades of excellent fastness properties. The dye has the structure

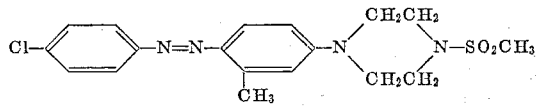

Example 2

An amount of 2.48 g. (0.12 m.) of 2,6-dichloro-4-nitroaniline was dissolved in 15 ml. conc. $H_2SO_4$ below 25° C. This solution was cooled to 0° C. and a solution of 0.88 g. $NaNO_2$ in 6 ml. conc. $H_2SO_4$ was added below 5° C. The diazotization was stirred for 2.5 hr. at 3–5° C. An amount of 3.62 g. of 1-(phenyl)-4-(phenylsulfonyl)piper- azine was dissolved in 80 ml. 15% aqueous $H_2SO_4$ plus 40 ml. 1:5 acid. This coupling mixture was chilled in an ice bath and the diazonium solution added with stirring. The coupling was neutralized to brown on Congo Red paper with solid ammonium acetate. It was then allowed to couple 2 hr., drowned with water, filtered, washed with water, and dried. The product dyes polyester fibers a bright orange shade with exceptionally good light- and sublimation-fastness. The dye has the structure:

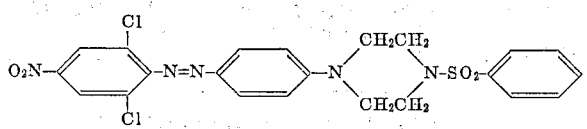

Example 3

An amount of 3.6 g. (0.05 m.) dry $NaNO_2$ was added slowly to 25 ml. conc. $H_2SO_4$. This solution was cooled in an ice-bath and 50 ml. 1:5 acid was added, keeping the temperature below 25° C. This solution was again cooled to about 3° C. and 10.9 g. (0.05 m.) 2-chloro-4,6-dinitroaniline was added with the temperature below 10° C. Then 50 ml. 1:5 acid was added at below 10°. The diazotization was stirred at 3–5° C. for 3 hr., then added to a solution of 15.1 g. of 1-(phenyl)-4-(phenyl-sulfonyl)piperazine in 100 ml. 1:5 acid. The coupling was neutralized to brown Congo Red paper with solid ammonium acetate and allowed to couple for 2 hr. It was then drowned in water, filtered, washed with water, and dried. The product dyes polyester fibers red shades with good fastness properties. It has the structure:

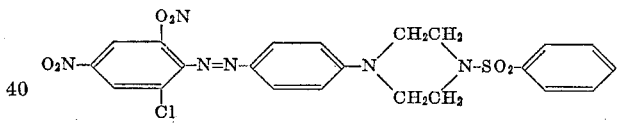

Example 4

An amount of 6.9 g. of p-nitroaniline was dissolved in 5.4 ml. of concentrated $H_2SO_4$ plus 12.6 ml. of water, and the solution poured over 50 g. of crushed ice. To this was added a solution of 3.6 g. of $NaNO_2$ dissolved in 8 ml. of water, and the reaction was stirred at 0–5° C. for 1 hr. After filtration, the diazonium solution was added to a chilled solution of 15.8 g. of 1-(phenylsulfonyl)-4-(m-tolyl)piperazine in 200 ml. of 1:5 acid (1 part propionic:5 parts acetic) plus 200 ml. of 15% $H_2SO_4$. This coupling mixture was kept below 10° C. and neutralized to brown on Congo Red paper with solid ammonium acetate. After coupling 2 hr. at ice-bath temperature, the mixture was drowned with water, filtered, washed with water, and air dried. The product dyes polyester fibers bright shades of orange with excellent light and sublimation fastness and has the following structure:

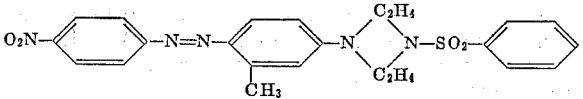

Example 5

A solution of 0.72 g. of dry $NaNO_2$ in 5 ml. of concentrated $H_2SO_4$ was cooled in an ice bath, and 10 ml. of 1:5 acid was added below 15° C. This stirred solution was cooled and 1.72 g. of 2-chloro-4-nitroaniline was added, followed by 10 ml. of 1:5 acid, all at 0–5° C. The diazotization was stirred at 0–5° C. and then added to a chilled solution of 3.35 g. of 1-(m-chlorophenyl)-4-(phenylsulfonyl)piperazine dissolved in 50 ml. of 1:5 acid plus 50 ml. of 15% H₂SO₄. The coupling mixture was kept cold and neutralized to brown on Congo Red paper with solid ammonium acetate. After coupling 2 hrs., the reaction mixture was drowned with water, filtered, washed with water, and air dried. The product imparts reddish-yellow shades to polyester fibers and has the following structure:

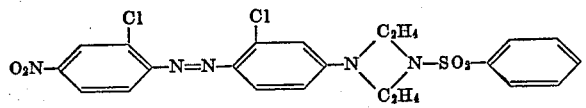

Example 6

2,6-dichloro-4-nitroaniline (2.07 g.) was diazotized as illustrated in Example 2, using the appropriate quantities of reagents. This diazonium solution was added to a cold solution of 3.16 g. of 1-(phenylsulfonyl)-4-(m-tolyl)piperazine dissolved in 40 ml. of 1:5 acid plus 40 ml. of 15% H₂SO₄. The coupling was kept cold and neutralized to brown on Congo Red paper with solid ammonium acetate. After 2 hr. the reaction mixture was drowned with water, filtered, washed with water, and air dried. The product dyes polyester fibers orange shades with good fastness properties and has the following structure:

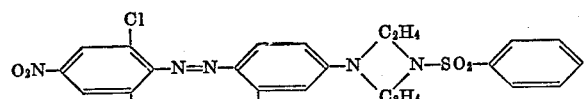

EXAMPLE 7

2,6-dichloro-4-nitroaniline (2.07 g.) was diazotized as in Example 2. The diazonium solution was added to a chilled solution of 3.16 g. of 1-phenyl-4-p-(tolylsulfonyl)piperazine in 50 ml. of 1:5 acid plus 50 ml. of 15% H₂SO₄. Solid ammonium acetate was added at 5–10° C. until the coupling mixture was neutral to Congo Red paper. After coupling 2 hr. the mixture was drowned with water, filtered, washed with water, and air dried. The product dyes polyester fibers orange shades and has the following structure:

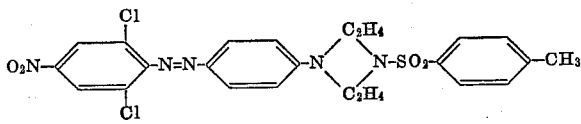

Example 8

2,6-dichloro-4-nitroaniline (2.07 g.) was diazotized as illustrated in Example 2. This diazonium solution was added to a chilled solution of 2.54 g. of 1-(methylsulfonyl)-4-(m-tolyl)piperazine in 35 ml. of 1:5 acid plus 35 ml. of 15% H₂SO₄. This mixture was neutralized to brown on Congo Red paper with solid ammonium acetate, allowed to couple 2 hr. at 5–10° C., drowned with water, filtered, washed with water, and the product air dried. It has the following structure:

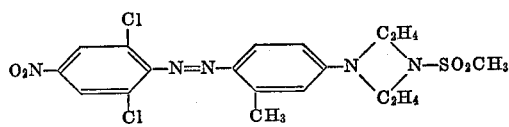

The azo compounds illustrated in the following table were prepared by the method illustrated in Examples 1 through 8. Thus, the diazonium salts of the compounds represented by Formula II were coupled with the compounds of Formula III to obtain the dyes having the general Formula I, above.

TABLE

| Examples | X | Y | R² | R³ | R⁴ | Color on polyesters |
|---|---|---|---|---|---|---|
| 9 | None | None | —CH₂CH₂— | —CH₂CH₂— | p-Tolyl | Yellow. |
| 10 | do | do | —CH₂CH₂— | —CH₂CH₂— | Phenyl | Do. |
| | | | \|CH₃ | \|CH₃ | | |
| 11 | p-NO₂ | 3-OCH₃ | —CH₂CH— | —CH₂CH— | p-Methoxyphenyl | Orange. |
| | | | \|CH₃ | \|CH₃ | | |
| 12 | p-NO₂ | 3-NHCOCH₃ | —CH₂CH— | —CH₂CH— | do | Do. |
| 13 | 2,4-di-NO₂-6-Cl | 3-CH₃ | —CH₂CH₂— | —CH₂CH₂— | p-Tolyl | Red. |
| 14 | 2,6-di-Cl-4-NO₂ | 3-CH₃ | —CH₂CH₂— | —CH₂CH₂— | do | Orange. |
| 15 | 2,6-di-Cl-4-NO₂ | 3-CH₃ | —CH₂CH₂— | —CH₂CH₂— | —CH₂CH₂CN | Do. |
| 16 | 2,6-di-Cl-4-NO₂ | 3-CH₃ | —CH₂CH₂— | —CH₂CH₂— | —CH₂CH₂OCH₃ | Do. |
| 17 | 2,6-di-Cl-4-NO₂ | 3-CH₃ | —CH₂CH₂— | —CH₂CH₂— | —C₄H₉-n | Do. |
| 18 | 2,6-di-Cl-4-NO₂ | 3-CH₃ | —CH₂CH₂— | —CH₂CH₂— | —Cyclohexyl | Do. |
| | | | | \|CH₃ | | |
| 19 | 2,SO₂CH₃-4-NO₂ | 3-Cl | —CH₂CH₂— | —CH₂CH— | —CH₂CH₂Cl | Yellow. |
| | | | | \|CH₃ | | |
| 20 | 2,SO₂CH₃-4-NO₂ | 3-Cl | —CH₂CH₂— | —CH₂CH— | —CH₂CH₂CONH₂ | Do. |
| | | | | \|CH₃ | | |
| 21 | 2,SO₂CH₃-4-NO₂ | 3-OCH₂CH₂OH | —CH₂CH₂— | —CH₂CH— | —2,4-di-Cl-phenyl | Orange. |
| 22 | 4-CF₃ | 3-CH₃ | —CH₂CH₂— | —CH₂CH₂— | α-Naphthyl | Do. |
| 23 | 4-CF₃ | 3-CH₃ | —CH₂CH₂— | —CH₂CH₂— | β-Naphthyl | Do. |
| 24 | 4-SO₂NH₂ | 3-CH₃ | —CH₂CH₂— | —CH₂CH₂— | 4-aminophenyl | Do. |
| 25 | 4-SO₂NH₂ | 3-CH₃ | —CH₂CH₂— | —CH₂CH₂— | 4-nitrophenyl | Do. |
| 26 | 4-OCH₃ | 3-CH₃ | —CH₂CH₂— | —CH₂CH₂— | 4-cyanophenyl | Yellow. |
| 27 | 4-NHCOCH₃ | 3-CH₃ | —CH₂CH₂— | —CH₂CH₂— | p-Tolyl | Do. |
| 28 | 4-SO₂C₂H₄CN | 3-CH₃ | —CH₂CH₂— | —CH₂CH₂— | do | Orange. |
| | | | \|CH₂Cl | \|CH₂Cl | | |
| 29 | 4-CONH₂ | None | —CH₂CH— | —CH₂CH— | do | Do. |
| 30 | 4-COOH | do | —CH₂CH₂— | —CH₂CH₂— | p-Bromophenyl | Do. |
| 31 | 2-OH | do | —CH₂CH₂— | —CH₂CH₂— | 2,5-di-chlorophenyl | Do. |
| 32 | 4-CO₂C₂H₅ | do | —CH₂CH₂— | —CH₂CH₂— |  | Do. |
| 33 | 4-COCH₃ | do | —CH₂CH₂— | —CH₂CH₂— | —C(Cl)₃ | Yellow. |
| 34 | 4-CHO | 3-CH₃ | —CH₂CH₂— | —CH₂CH₂— | Phenyl | Do. |
| 35 | 3-CH₂OH | 3-CH₃ | —CH₂CH₂— | —CH₂CH₂— | do | Do. |
| 36 | 4-NO₂-2-CN | 3-CH₃ | —CH₂CH₂— | —CH₂CH₂— | do | Orange. |
| 37 | 4-NO₂-2-CN | 3-CH₃ | —CH₂CH₂— | —CH₂CH₂— | p-Tolyl | Do. |

The azo compounds of the invention may be used for dyeing hydrophobic fibers such as linear polyester, cellulose ester, acrylic, polyamide, etc., fibers in the manner described in U.S. Patents 2,880,050, 2,757,064, 2,782,187 and 2,043,827. The following examples illustrate methods by which the azo compounds of the invention can be used to dye polyester textile materials.

0.1 g. of the dye is dissolved in the dye pot by warming in 5 cc. of ethylene glycol monomethyl ether. A 2% sodium-N-methyl-N-oleyl taurate and 0.5% sodium lignin sulfonate aqueous solution is added, with stirring, until a fine emulsion is obtained. Water is then slowly added to a total volume of 200 cc. 3 cc. of Dacronyx (a chlorinated benzene emulsion) are added and 10 grams of a textile fabric made of Kodel polyester fibers are entered. The fabric is worked 10 minutes without heat and then for 10 minutes at 80° C. The dye bath is then brought to the boil and held at the boil for one hour. Following this, the fabric is rinsed in warm water, then scoured in an aqueous 0.2% soap, 0.2% ash solution. After scouring, the fabric is rinsed with water and dried. Accordingly, since the azo compounds of the invention are water-insoluble, they can be applied from aqueous dispersions in the manner of the so-called "dispersed dyes." However, coloration can also be effected, for example, by incorporating the azo compounds into the spinning dope and spinning the fiber as usual. The azo compounds of our invention have varying utility as dyes. The degree of utility varies, for example, depending upon the material being dyed and the formula of the azo compound. Thus, for example, all the dyes will not have the same degree of utility for the same material. As mentioned above, the substituents X and Y and substituents on the $R^4$ group are not critical and serve primarily as auxochrome groups to control the color of the azo compound.

As described above, the present azo compounds contain the characteristic structure of Formula I. This distinctive structure imparts unexpected properties to the present azo compounds, especially when the compounds are used for dyeing textiles, including improved fastness to light and improved affinity for polyester fibers. Thus, the compounds of the invention in general can be expected to be superior to similar dyes when tested by methods such as described in the A.A.T.C.C. Technical Manual, 1964 edition, depending in part upon the particular dye used and the fiber being dyed.

Polymeric linear polyester materials of the terephthalate type are illustrative of the linear aromatic polyester textile materials that can be dyed with the new azo compounds of our invention. The terephthalate fibers sold under the trademarks "Kodel," "Dacron," and "Terylene," for example, are illustrative of the polyester textile materials that can be dyed. Kodel polyester fibers are more particularly described in U.S. Patent 2,901,446. Dacron and Terylene polyester fibers are described, for example, in U.S. Patent 2,465,319. The polymeric linear polyester materials disclosed in U.S. Patents 2,945,010, 2,957,745 and 2,989,363 for example, can be dyed. The linear aromatic polyester materials specifically named have a melting point of at least 200° C.

The invention has been described in considerable detail with particular reference to certain preferred embodiments thereof, but it will be understood that variations and modifications can be effected within the spirit and scope of the invention as described hereinabove.

We claim:

1. A water-insoluble azo compound having the formula

[Structure: phenyl-X$_{(m)}$ —N=N— phenyl-Y$_{(n)}$ —N(R$_2$)(R$_3$)—N—SO$_2$R$_4$]

wherein
X represents lower alkyl, lower alkoxy, lower alkanoylamino, nitro, bromine, chlorine, cyano, lower alkylsulfonyl, cyanoethylsulfonyl, carbamoyl, benzamido, lower carboalkoxy, lower alkanoyl, formyl, trifluoromethyl, sulfamoyl, lower alkylsulfonamido, or lower dialkylsulfamoyl;

m is 0, 1, 2 or 3;

Y represents lower alkyl, lower alkoxy, bromine, chlorine, lower alkylthio, lower alkanoylamino, lower alkylsulfonamido, or benzamido;

n represents 0, 1 or 2;

$R_2$ and $R_3$ are the same or different and each represents alkylene of 2 to 4 carbon atoms; and $R_4$ represents lower alkyl; lower alkyl substituted with cyano, chlorine, methoxy, or carbamoyl; phenyl; phenyl substituted with chlorine, bromine, methyl, methoxy, amino, nitro, or cyano, cyclohexyl; naphthyl; or 2-thienyl.

2. A water-insoluble azo compound having the formula

[Structure: phenyl-X$_{(m)}$ —N=N— phenyl-Y$_{(n)}$ —N(CH$_2$CH$_2$)$_2$N—SO$_2$R$_4$]

wherein
X represents nitro, chlorine, bromine, lower alkylsulfonyl, trifluoromethyl, or cyano;

m represents 1, 2, or 3;

Y represents lower alkyl, lower alkoxy, chlorine, bromine, or lower alkanoylamino;

n represents 0, 1, or 2; and $R_4$ represents lower alkyl, phenyl, or tolyl.

3. The dye:

[Structure: Cl—phenyl—N=N—phenyl(CH$_3$)—N(CH$_2$CH$_2$)$_2$N—SO$_2$CH$_3$]

4. The dye:

[Structure: O$_2$N—phenyl(Cl)(Cl)—N=N—phenyl—N(CH$_2$CH$_2$)$_2$N—SO$_2$—phenyl]

5. The dye:

[Structure: O$_2$N—phenyl(O$_2$N)(Cl)—N=N—phenyl—N(CH$_2$CH$_2$)$_2$N—SO$_2$—phenyl]

6. The dye:

[Structure: O$_2$N—phenyl—N=N—phenyl(CH$_3$)—N(C$_2$H$_4$)$_2$N—SO$_2$—phenyl]

7. The dye:

[Structure: O$_2$N—phenyl(Cl)(Cl)—N=N—phenyl—N(C$_2$H$_4$)$_2$N—SO$_2$—phenyl]

8. The dye:

[Structure: O$_2$N—phenyl(Cl)(Cl)—N=N—phenyl(CH$_3$)—N(C$_2$H$_4$)$_2$N—SO$_2$—phenyl]

9. The dye:
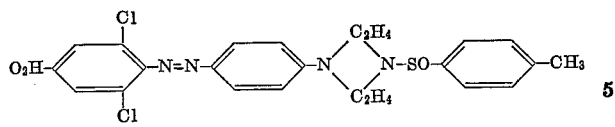
10. The dye:
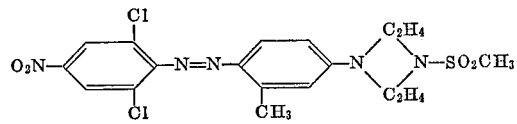
References Cited
UNITED STATES PATENTS
| | | | |
|---|---|---|---|
| 2,229,744 | 1/1941 | Kern | 260—140 |
| 2,365,345 | 12/1944 | Kirby et al. | 260—268 XR |
| 3,086,003 | 4/1963 | Baumann et al. | 260—154 XR |
FOREIGN PATENTS
957,445  5/1964  Great Britain.
FLOYD D. HIGEL, Primary Examiner
U.S. Cl. X.R.
8—41, 50; 260—152, 268